(12) United States Patent
Khalili

(10) Patent No.: US 10,132,292 B1
(45) Date of Patent: Nov. 20, 2018

(54) HONECOMB WIND CAPTURE ARRANGEMENT

(71) Applicant: Ali Khalili, Abu Dhabi (AE)

(72) Inventor: Ali Khalili, Abu Dhabi (AE)

(*) Notice: Subject to any disclaimer, the term of this patent is extended or adjusted under 35 U.S.C. 154(b) by 1067 days.

(21) Appl. No.: 14/492,006

(22) Filed: Sep. 20, 2014

(51) Int. Cl.
*F03D 3/04* (2006.01)

(52) U.S. Cl.
CPC .................. *F03D 3/0409* (2013.01)

(58) Field of Classification Search
CPC .................. F03D 3/04; F03D 3/0409
See application file for complete search history.

(56) References Cited

U.S. PATENT DOCUMENTS

| | | |
|---|---|---|
| 4,350,900 A | 9/1982 | Baughman |
| 6,655,907 B2 | 12/2003 | Brock |
| 6,962,478 B2 | 11/2005 | Tsipov |
| 8,210,792 B2 * | 7/2012 | Suma .................... F03D 3/0409 415/126 |
| 2011/0058936 A1 | 3/2011 | Van Wyk |
| 2011/0070071 A1 | 3/2011 | Krasnov |

* cited by examiner

*Primary Examiner* — Christopher Verdier
*Assistant Examiner* — Maxime Adjagbe
(74) *Attorney, Agent, or Firm* — Quickpatents, LLC; Kevin Prince

(57) ABSTRACT

A modular panel for covering a portion of a structure and directing air impacting against the structure into a common path to harness wind energy includes a rear side that is adapted for mounting with the structure and a front side having a plurality of apertures therethrough. At least one central conduit leads from an inlet port on a first edge of the modular panel to an outlet port on a second edge of the modular panel. A plurality of branch conduits are each fixed between one of the plurality of apertures and the at least one central conduit. At least one of the modular panels affixed to the structure further preferably includes a wind turbine within the panel and along the central conduit. The wind turbine is adapted for receiving air from the central conduit and each branch conduit for spinning the wind turbine to produce electricity.

13 Claims, 4 Drawing Sheets

HONECOMB WIND CAPTURE ARRANGEMENT

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to wind energy, and more particularly to a building panel for harvesting wind energy impacting buildings and other structures.

DISCUSSION OF RELATED ART

High winds are often associated with high-rise buildings, as wind impacting such buildings is directed either down towards the street or around the buildings. The compounding effect of multiple buildings in close proximity often creates strong winds, yet the wind energy represented thereby is subsequently lost. No prior art devices are useful for capturing such wind energy that is currently just absorbed by the building.

Several prior art products are known for converting wind blowing in a generally horizontal direction into electricity. For example, US Patent Application 2011/0058936 to Van Wyk on Mar. 10, 2011 teaches a wind turbine duct arrangement for with a building to capture wind impacting the building into electricity. Similarly, U.S. Pat. No. 8,210,792 to Suma on Jul. 3, 2012 teaches a wind energy system for incorporating within the roof of a building such as a house. Such prior art devices are not well-suited for retrofitting onto existing building structures, however, and require significant internal space within the building. Stacking a plurality of such prior art devices to take advantage of a high-rise building's height is not practical or even feasible with such products.

Other prior art devices serve to convert horizontally-flowing air into electricity, such as US Patent Application 2011/0070071 to Krasnov et al., on Mar. 24, 2011, and U.S. Pat. No. 6,962,478 to Tsipov on Nov. 8, 2005. Such devices, however, are not easily stacked or used as a facade of a building structure. As such, only limited energy products is possible with such devices when used in conjunction with high-rise buildings.

Therefore, there is a need for a device that is relatively simple to retrofit onto an existing structure and that utilize none of the internal space within the structure. Such a needed invention would be relatively inexpensive to manufacture and install, and would be useful with buildings by stacking connecting multiple such products together in a daisy chain arrangement. Such a needed device would allow wind energy impacting the structure from any side to be used to produce electricity. The present invention accomplishes these objectives.

SUMMARY OF THE INVENTION

The present device is a modular panel for covering a portion of a structure and directing air impacting against the structure into a common path to harness wind energy. Such a structure, for example, may be a high-rise building, a house, a block wall, a fence, or the like. The modular panel includes a rear side that is adapted for mounting with the structure, such as with adhesive, mechanical fasteners (not shown), or the like.

A front side of the modular panel has a plurality of apertures therethrough. The apertures may completely cover the front side of the panel, or just partially cover the front side of the panel. In one preferred embodiment, the front and rear sides, are generally rectangular and have four edges. As such, multiple such panels may be easily affixed to the structure and to each other, again with either adhesive, mechanical fasteners, or the like.

At least one central conduit leads from an inlet port on a first edge of the modular panel to an outlet port on a second edge of the modular panel. The at least one conduit is adapted to receive moving air from the first edge and delivering it to the second edge. The outlet port is preferably adapted for aligning with the inlet port of an adjacent panel.

A plurality of branch conduits are each fixed at an input end thereof at one of the plurality of apertures of the front side of the modular panel. Each branch conduit terminates at an output end thereof in the at least one central conduit. Each branch conduit is adapted to receive air at the front side of the modular panel and to direct the air towards the at least one central conduit in a direction of air flow towards the second edge. The panel may be almost completely filled internally with the branch conduits, or just a few branch conduits, in cooperation with the number of apertures thereof.

Preferably each aperture on the front side of the panel takes a hexagonal shape, so that many such apertures may nest together to substantially cover the entire front side of the panel. Each aperture may further include a protruding lip on at least one side thereof for further capturing of the wind that may be blowing relatively parallel to the front side of the panel.

In one embodiment, the panel takes an L-shape in top plan view, such a panel being adapted for fitting around a corner of the structure. Alternately, the panel may take a generally spherical shape and include an outer surface that includes the apertures. In such an embodiment, the panel may be used as a stand-alone wind capture device not necessarily associated with the structure.

At least one of the modular panels affixed to the structure further preferably includes a wind turbine within the panel and along the central conduit. The wind turbine is adapted for receiving air from the central conduit and each branch conduit for spinning the wind turbine to produce electricity. As such, the central conduit preferably also includes at least two conductive wires therealong for transmitting the power generated by the wind turbine to an adjacent panel or other device.

Preferably the wind turbine includes an elongated core enclosure through which the air from the central conduit and branch conduits is introduced. The core enclosure encloses a rotating propeller having air-moved fins to an outer surface thereof. A plurality of magnets is fixed on an inner surface of the rotating propeller. The core enclosure is fixed with a pair of rotating bearings at a top and bottom side thereof, and the propeller and bearings surround a central shaft having a coiled conductor through which an inductive current is produced when the propeller rotates. Alternately, the air may be delivered by the last such panel in a chain of such panels to a separate wind turbine for producing electricity.

The present invention is a device that is relatively simple to retrofit onto an existing structure and that utilize none of the internal space within the structure. The present device is relatively inexpensive to manufacture and install, and is useful with even tall buildings by stacking and connecting multiple such products together in a daisy chain arrangement. Such a device captures wind energy impacting the structure from any side to produce electricity. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
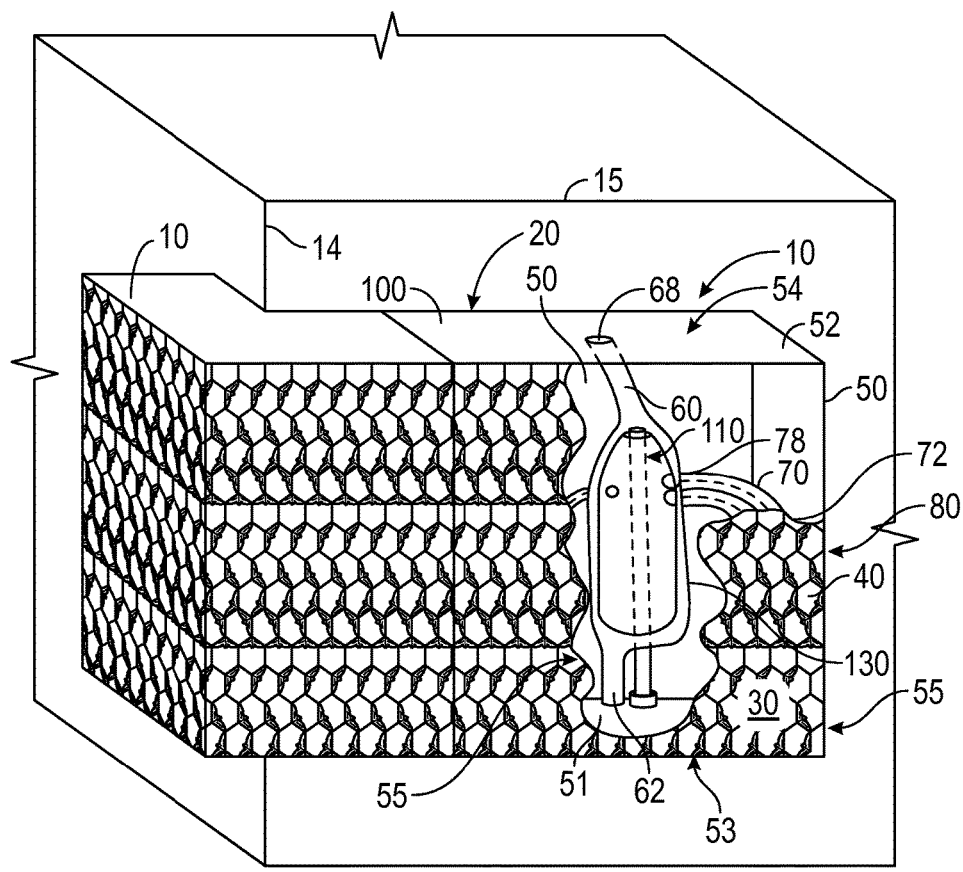
FIG. 1 is a perspective view, partially cut-away, of two panels of the invention fixed with a structure.
Figure 2:
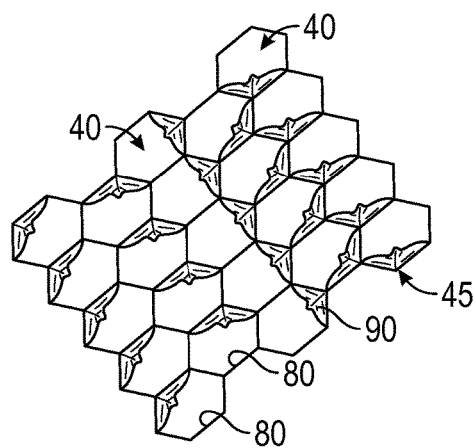
FIG. 2 is a partial perspective view of a plurality of apertures in a front side of a panel of the invention.
Figure 3:
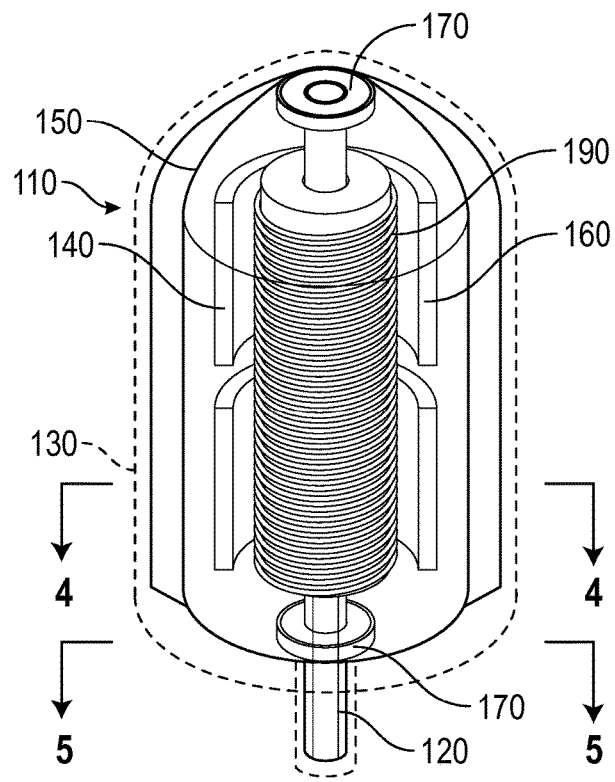
FIG. 3 is a partially cut-away perspective view of a wind turbine within the panel of the invention.
Figure 4:
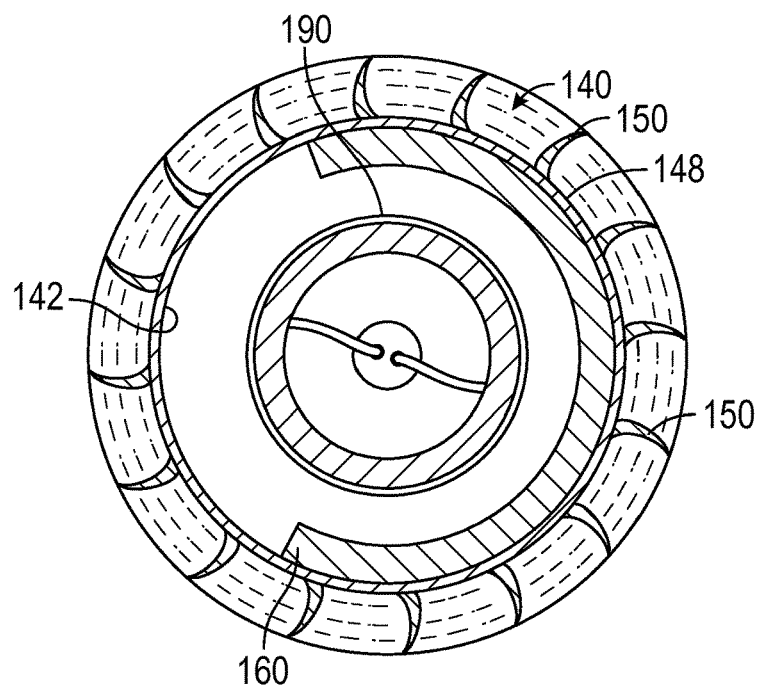
FIG. 4 is a cross-sectional view horizontally across a center portion of the wind turbine, taken generally along line 4-4 of FIG. 3.
Figure 5:
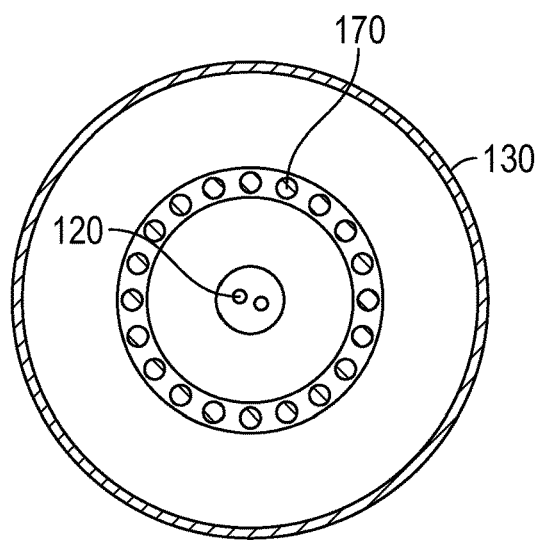
FIG. 5 is a cross-sectional view horizontally across a bearing of the wind turbine, taken generally along line 5-5 of FIG. 3.

FIGS. 1 and 2 illustrate a modular panel 10 for covering a portion of a structure 15 and directing air impacting against the structure 15 into a common path to harness wind energy. Such a structure 15, for example, may be a high-rise building, a house, a block wall, a fence, or the like. It is understood that while one panel 10 is claimed herein, the structure 15 may be covered by a plurality of such panels 10 all cooperating to collectively funnel air along a common path to capture the wind energy thereof.

The modular panel 10 includes a rear side 20 that is adapted for mounting with the structure 15, such as with adhesive, mechanical fasteners (not shown), or the like. Such a fastening means is arbitrary as long as the panel 10 is securely fixed with the structure 15 so as not to move or shift relative to the structure 15. A front side 30 of the modular panel 10 has a plurality of apertures 40 therethrough. The apertures 40 may completely cover the front side 30 of the panel 10, or just partially cover the front side 30 of the panel 10. In one preferred embodiment, the front and rear sides 30,20 are generally rectangular and have four edges 50. As such, multiple such panels 10 may be easily affixed to the structure 15 and to each other, again with either adhesive, mechanical fasteners, or the like.

At least one central conduit 60 leads from an inlet port 62 on a first edge 51 of the modular panel 10 to an outlet port 68 on a second edge 52 of the modular panel 10. The at least one conduit 60 is adapted to receive moving air from the first edge 51 and delivering it to the second edge 52. The outlet port 68 is preferably adapted for aligning with the inlet port 62 of an adjacent panel 10. In some cases the inlet port 62 is on a side edge 55 of the panel 10 or on the lower side 53 of the panel 10, while the outlet port 68 may be on a side edge 55 of the panel 10 or on an upper side 54 of the panel 10.

In one embodiment, the first edge 51 is on a lower side 53 of the modular panel 10, and the second edge 52 is on an opposing upper side 54 thereof (FIG. 1). Alternately, the first edge 51 may be on the lower side 53 of the modular panel 10 and the second edge 52 is on an adjacent side edge 55 thereof. Some panels 10 may include multiple air inlet ports 62 and only a single air outlet port 68 (not shown). Other panels 10 may include multiple air outlet ports 62 but only a single air inlet port 68 (not shown). Other panels 10 may have both multiple inlet and outlet ports 62,68 (not shown).

A plurality of branch conduits 70 are each fixed at an input end 72 thereof at one of the plurality of apertures 40 of the front side 30 of the modular panel 10. Each branch conduit 70 terminates at an output end 78 thereof in the at least one central conduit 60. Each branch conduit 70 is adapted to receive air at the front side 30 of the modular panel 10 and to direct the air towards the at least one central conduit 60 in a direction of air flow towards the second edge 52. The panel 10 is preferably substantially rigid and may be almost completely filled internally with the branch conduits 70, or just a few branch conduits 70, in cooperation with the number of apertures 40 thereof. Internal spaces within the panel 10 that do not include any of the branch conduits 70 may be filled with foam, internal mechanical braces (not shown), or other filling materials that provide for a relatively non-moveable front side 30 when the panel 10 is installed on the structure 15. At least the front side 30 of the panel 10 is made from a material strong enough to withstand strong winds and inclement weather.

Preferably each aperture 40 on the front side 30 of the panel 10 takes a hexagonal shape 80 (FIG. 2), so that many such apertures 40 may nest together to substantially cover the entire front side 30 of the panel 10. Each aperture 40 may further include a protruding lip 90 on at least one side 45 thereof for further capturing of the wind that may be blowing relatively parallel to the front side 30 of the panel 10.

As such, the structure 15 with a plurality of the modular panels 10 on all sides thereof captures wind energy on any side of the structure 15 and delivers such wind energy into the common path for capture thereof.

Figure 6:
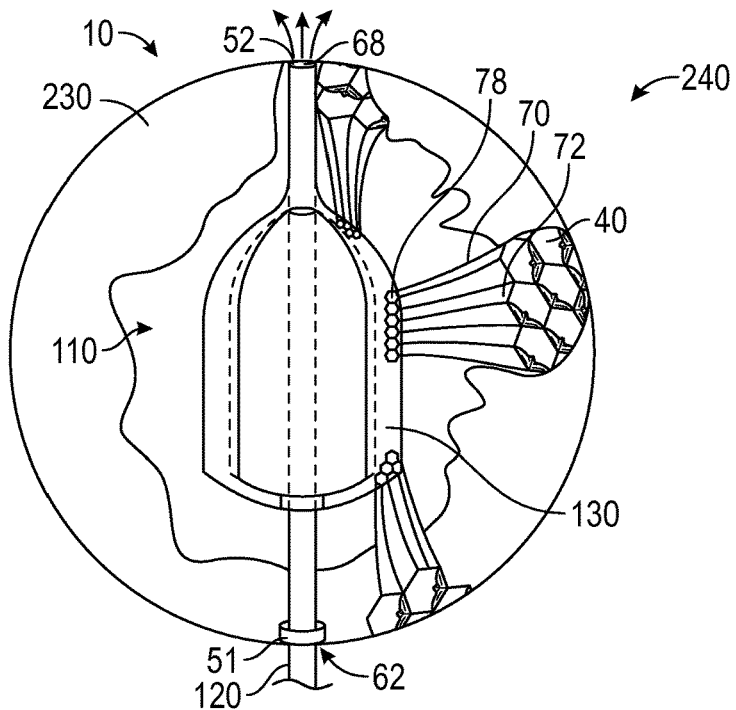
FIG. 6 is a perspective view, partially cut-away, of a spherical embodiment of the invention.
Figure 7:
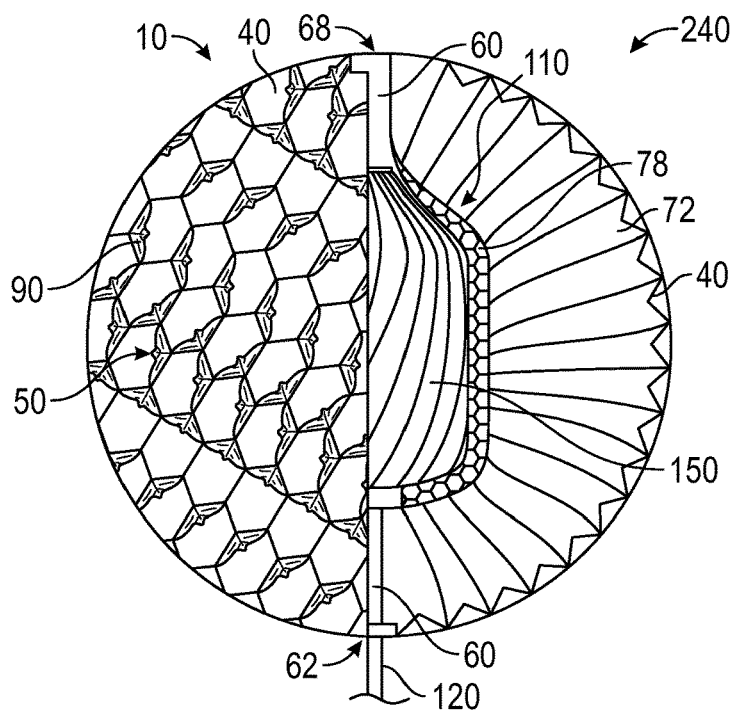
FIG. 7 is a front elevational view of the embodiment of FIG. 6, partially cut-away on one side.

In one embodiment, the panel 10 takes an L-shape 100 in top plan view, such panel 10 being adapted for fitting around a corner 14 of the structure 15. Alternately, the panel 10 may take a generally spherical shape 240 and include an outer surface 230 that includes the apertures 40 (FIGS. 6 and 7). In such an embodiment, the panel 10 may be used as a stand-alone wind capture device not necessarily associated with the structure 15.

At least one of the modular panels 10 affixed to the structure 15 further preferably includes a wind turbine 110 (FIGS. 3-7) within the panel 10 and along the central conduit 60. The wind turbine 110 is adapted for receiving air from the central conduit 60 and each branch conduit 70 for spinning the wind turbine 110 to produce electricity. As such, the central conduit 60 preferably also includes at least two conductive wires 120 therealong for transmitting the power generated by the wind turbine 110 to an adjacent panel 10 or other device (not shown). Alternately the conductive wires 120 may be fixed to the rear side 20 or front side 30 of the panel 10. Such conductive wires terminate at connectors (not shown) for connecting with the conductive wires 120 of an adjacent panel 10. A suitable electrical connection to the structure's power supply (not shown) or other load is included after all of the panels 10 are installed on the structure 15.

Preferably the wind turbine 110 includes an elongated core enclosure 130 through which the air from the central conduit 60 and branch conduits 70 is introduced. The core enclosure 130 encloses a rotating propeller 140 having air-moved fins 150 to an outer surface 148 thereof. A plurality of magnets 160 is fixed on an inner surface 142 of the rotating propeller 140. The core enclosure 130 is fixed with a pair of rotating bearings 170 at a top and bottom side thereof, and the propeller 140 and bearings 170 surround a central shaft 180 having a coiled conductor 190 through which an inductive current is produces when the propeller 140 rotates. Alternately, the air may be delivered by the last such panel 10 in a chain of such panels 10 to a separate wind turbine (not shown) for producing electricity. For example, a building structure 15 may include a plurality of panels 10 that all contribute air through their central conduits 60 to a final top-most panel 10 that delivers the air through its outlet port 68 to the at least one wind turbine, such wind turbines being located on the roof of the building 15, for instance.

While a particular form of the invention has been illustrated and described, it will be apparent that various modifications can be made without departing from the spirit and scope of the invention. For example, other shapes of the panel 10 may be utilized as desired, as well as alternate configurations of the inlet port 62 and the outlet port 68 with respect to the edges 50 of the panel 10. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A modular panel for covering a portion of a structure and directing air impacting against the structure into a common path to harness wind energy, the modular panel comprising:
   a rear side adapted for mounting with the structure;
   a front side having a plurality of apertures therethrough;
   at least one central conduit leading from an inlet port on a first edge to an outlet port on a second edge, the at least one conduit adapted for receiving moving air from the first edge and delivering it to the second edge;
   a plurality of branch conduits each fixed at an input end thereof at a respective one of the plurality of apertures of the front side and each branch conduit terminating at an output end in the at least one central conduit, each branch conduit adapted to receive air at the front side of the modular panel and to direct the air towards the at least one central conduit in a direction of air flow towards the second edge;
   a wind turbine included within the modular panel and along the central conduit, the wind turbine adapted for receiving air from the central conduit and each branch conduit for spinning the wind turbine to produce electricity, the central conduit including a plurality of conductive wires therealong for transmitting the power generated by the wind turbine to an adjacent panel, the wind turbine including an elongated core enclosure through which the air from the central conduit and branch conduits is introduced, the core enclosure enclosing a rotating propeller having air-moved fins on an outer surface thereof and a plurality of magnets on an inner surface thereof, the core enclosure fixed with a pair of rotating bearings, the propeller and bearings surrounding a central shaft having a coiled conductor through which an inductive current is produced when the propeller rotates;

whereby the structure having a plurality of the modular panels on at least one side of the structure captures air impacting on the at least one side of the structure to conduct the air into the common path for capture of energy produced thereby.

2. The modular panel of claim 1 wherein the front and rear sides are generally rectangular and have four edges.

3. The modular panel of claim 2 wherein the first edge is on a lower side thereof and the second edge is on an opposing upper side thereof.

4. The modular panel of claim 2 wherein the first edge is on a lower side thereof and the second edge is on an adjacent side edge thereof.

5. The modular panel of claim 1 wherein each aperture on the front side of the modular panel is generally hexagonal in shape.

6. The modular panel of claim 5 each aperture on the front side of the modular panel includes a protruding lip on at least one side thereof for further capturing the wind.

7. The modular panel of claim 1 wherein the modular panel is generally L-shaped in a top-plan view, the modular panel being adapted for fitting around a corner of the structure.

8. The modular panel of claim 1 wherein the outlet port of the modular panel is adapted for aligning with the inlet port of the adjacent panel.

9. A modular panel for directing air impacting against the structure into a common path to harness wind energy, the modular panel comprising:

an outer side having a plurality of apertures therethrough;

at least one central conduit leading from an inlet port on a first side to an outlet port on a second side, the at least one conduit adapted for receiving moving air from the first side and delivering it to the second side;

a plurality of branch conduits each fixed at an input end thereof at a respective one of the plurality of apertures of the outer side and each branch conduit terminating at an output end in the at least one central conduit, each branch conduit adapted to receive air at the outer side of the modular panel and to direct the air towards the at least one central conduit in a direction of air flow towards the second side;

a wind turbine included within the modular panel and along the central conduit, the wind turbine adapted for receiving air from the central conduit and each branch conduit for spinning the wind turbine to produce electricity, the central conduit including a plurality of conductive wires therealong for transmitting the power generated by the wind turbine to an adjacent panel, wherein the wind turbine includes an elongated core enclosure through which the air from the central conduit and branch conduits is introduced, the core enclosure enclosing a rotating propeller having air-moved fins on an outer surface thereof and a plurality of magnets on an inner surface thereof, the core enclosure fixed with a pair of rotating bearings, the propeller and bearings surrounding a central shaft having a coiled conductor through which an inductive current is produced when the propeller rotates;

whereby the modular panel captures air impacting on the outer side to conduct the air into the common path for capture of energy produced thereby.

10. The modular panel of claim 9 wherein the modular panel is generally spherical.

11. The modular panel of claim 9 wherein each aperture on the outer side of the modular panel is generally hexagonal in shape.

12. The modular panel of claim 11 wherein each aperture on the outer side of the modular panel further includes a protruding lip on at least one side thereof for further capturing the wind.

13. The modular panel of claim 9 wherein the outlet port of the modular panel is adapted for aligning with the inlet port of the adjacent panel.

* * * * *